(12) United States Patent
Xu et al.

(10) Patent No.: US 11,072,014 B2
(45) Date of Patent: Jul. 27, 2021

(54) TOOL-TRANSITION-FREE MACHINING METHOD AND CLAMP FOR WHEEL OUTER RIM

(71) Applicant: CITIC Dicastal CO., LTD., Hebei (CN)

(72) Inventors: Zuo Xu, Qinhuangdao (CN); Guoyuan Xiong, Qinhuangdao (CN); Huiying Liu, Qinhuangdao (CN); Kuisheng Nie, Qinhuangdao (CN); Xiao Liu, Qinhuangdao (CN); Weidong Liu, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 41 days.

(21) Appl. No.: 16/512,405

(22) Filed: Jul. 16, 2019

(65) Prior Publication Data
US 2020/0147667 A1　May 14, 2020

(30) Foreign Application Priority Data
Nov. 12, 2018　(CN) .......................... 201811338129.8

(51) Int. Cl.
*B21D 28/30* (2006.01)
*B21D 53/30* (2006.01)

(52) U.S. Cl.
CPC .............. *B21D 28/30* (2013.01); *B21D 53/30* (2013.01); *B23B 2215/08* (2013.01); *F16C 2326/02* (2013.01)

(58) Field of Classification Search
CPC .... B21D 28/30; B21D 53/30; B23B 2215/08; B23B 5/28; B23B 31/16158; F16C 2326/02; B23P 15/00; B23P 2700/50; B23Q 3/08; B23Q 3/082
See application file for complete search history.

(56) References Cited

U.S. PATENT DOCUMENTS

2008/0011130 A1　1/2008　Smyth
2019/0061092 A1　2/2019　Liu et al.

FOREIGN PATENT DOCUMENTS

| CN | 204639163 U | 9/2015 |
| CN | 107414193 A | 12/2017 |
| WO | 2005099942 A1 | 10/2005 |

OTHER PUBLICATIONS

European Search Report in the European application No. 19201501.4, dated Apr. 2, 2020.

*Primary Examiner* — Ryan J. Walters
(74) *Attorney, Agent, or Firm* — Syncoda LLC; Feng Ma

(57) ABSTRACT

A tool-transition-free machining method includes: first, a primary turning is conducted, then holes are drilled out by a machining center, and finally a secondary turning is conducted.

1 Claim, 5 Drawing Sheets

TOOL-TRANSITION-FREE MACHINING METHOD AND CLAMP FOR WHEEL OUTER RIM

CROSS-REFERENCE TO RELATED APPLICATION

The present application claims benefit of Chinese Patent Application No. 201811338129.8, filed on Nov. 12, 2018, the content of which is hereby incorporated by reference in its entirety.

BACKGROUND

At present, most aluminum wheel machining is conducted in three steps, namely, primary turning, secondary turning, and drilling hole by a machining center, wherein during primary turning, cast wheel lips on the front side of a wheel are used for positioning and clamping, and an inner rim, a spoke back cavity, a center hole, a flange and part of an outer rim are turned; during secondary turning, radial positioning is achieved through a center hole formed through primary turning, an inner flange of the primary turning is used for axial positioning and compression, and the remaining outer rim, the front side of the wheel and a cap which are not turned during primary turning are turned during secondary turning. The traditional positioning machining method has a defect that the wheel outer rim cannot be formed in one effort, the wheel outer rim is machined through primary turning and secondary turning jointly, and the tool-transition position is usually located at an outer wheel edge. Since the outer rim is machined by two procedures jointly, a tool-transition edge exists at the tool-transition position, that is, the coaxiality of primary turning and secondary turning is not good, the problem that the run-out difference between an inner bead seat and an outer bead seat is too large is prone to being caused, average run-out of the inner side and the outer side is out of tolerance, and balance is out of tolerance due to eccentricity between the primary turning and secondary turning. Based on the current situation, the patent provides a tool-transition-free machining method and clamp for a wheel outer rim.

SUMMARY

The disclosure relates to the technical field of wheel machining, in particular to a tool-transition-edge-free machining method and clamp for an outer rim after wheel machining.

The object of the disclosure is to provide a tool-transition-free machining method and clamp for a wheel outer rim, thus, the wheel outer rim is machined in one effort, by adopting the method, tool-transition of the wheel outer rim is avoided, which is more favorable for control over average run-out and balance of the inner side and the outer side. The clamp adopted by the method is advanced in process, stable, efficient and easy to manufacture.

In order to achieve the object, the disclosure adopts the technical scheme that: a tool-transition-free machining method for a wheel outer rim comprises the process steps that firstly, primary turning is conducted, then holes are drilled by machining center, and finally secondary turning is conducted.

(1) During the primary turning, specifically, cast wheel lips on the front side of a wheel are used for positioning and clamping, and an inner rim, a spoke back cavity, a center hole and a flange are turned entirely; an outer rim from the inner flange to the outer wheel edge is roughly turned, and after the outer rim is roughly turned, 0.2-0.3 mm of process redundancy is reserved for fine turning.

(2) Holes are drilled by a machining center as follows: after primary turning is completed, bolt holes, a valve aperture, a bolt hole chamfer and a valve aperture countersink are drilled out by the machining center.

(3) During the secondary turning, specifically, a flange surface machined by primary turning is used for radial positioning, the center hole machined by primary turning is used for radial positioning, an inclined surface on the upper portion of a straight table of the center hole machined by primary turning is used for compression, the front side, a cap and part of the outer rim which is not machined during primary turning are turned during secondary turning, the part of the outer rim which is not machined during primary turning is roughly turned at first, the reserved process redundancy is 0.2-0.3 mm, finally, the whole wheel outer rim is finely turned once or twice, thus, the whole outer rim is machined in one effort, and the outer rim is free of tool-transition.

A tool-transition-free machining clamp for a wheel outer rim is composed of a rotating chassis, an axial positioning column, a tensioning oil cylinder, a radial positioning ring, an adjusting oil cylinder, guide pins, compression blocks, a tapered extension core, push rods and springs. The axial positioning column is fixed to the center of the rotating chassis, a flange plate on the axial positioning column is in contact with a flange face of a wheel, and axial positioning is achieved. The axial positioning column is internally provided with the tensioning oil cylinder, and the output end of the tensioning oil cylinder is connected with the radial positioning ring, and the outer wall of the radial positioning ring makes contact with a center hole of the wheel, so that radial positioning is achieved. The adjusting oil cylinder is mounted in the radial positioning ring, and the output end of the adjusting oil cylinder is connected with the tapered extension core. One end of the push rod is fixed on the corresponding compression block, and the other end of the push rod is matched with the tapered extension core. The compression blocks are connected with the inner wall of the radial positioning ring through the springs and the guide pins.

After the wheel is placed in the clamp for positioning, the adjusting oil cylinder is started, and the tapered extension core is pulled to move downwards, thus, the compression blocks are pushed by the push rods to radially move outwards, when the compression blocks move outwards to the appropriate position, the tensioning oil cylinder is started, and the radial positioning ring is driven to move downwards, so that the compression blocks press against the inclined surface on the upper portion of a straight table of the center hole, and the wheel is compressed. In an embodiment, the number of the compression blocks may be 6 to 10. After the wheel is machined, the tapered extension core moves upwards, and the compression blocks are reset through elastic force of the springs.

Through the machining method and clamp, one-step machining of the wheel outer rim can be completed. By adopting the method, the wheel outer rim is free of tool-transition, which is more favorable for control over average run-out and balance of the inner side and the outer side of the wheel. The clamp adopted by the method is advanced in process, stable, efficient and easy to manufacture.

LIST OF REFERENCE SYMBOLS

1—rotating chassis, 2—axial positioning column, 3—tensioning oil cylinder, 4—radial positioning ring, 5—adjusting oil cylinder, 6—guide pin, 7—compression block, 8—tapered extension core, 9—push rod and 10—spring.

DETAILED DESCRIPTION

The details and operation conditions of the specific device proposed by the disclosure will be given below with reference to the drawings.

Figure 1:
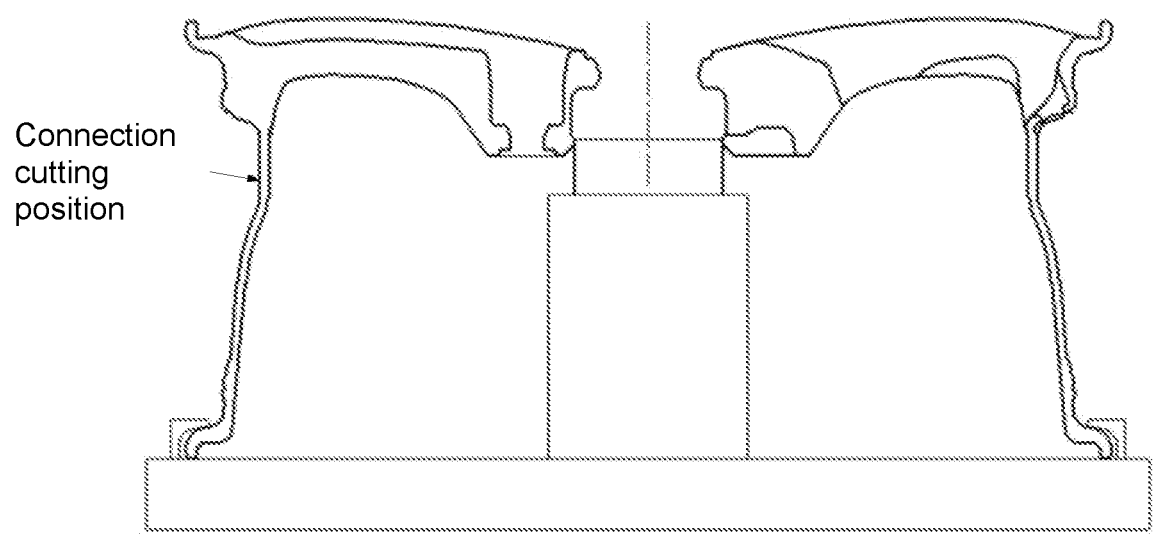
FIG. 1 is a schematic view showing the positioning and clamping mode during secondary turning of a conventional machining method.
Figure 2:
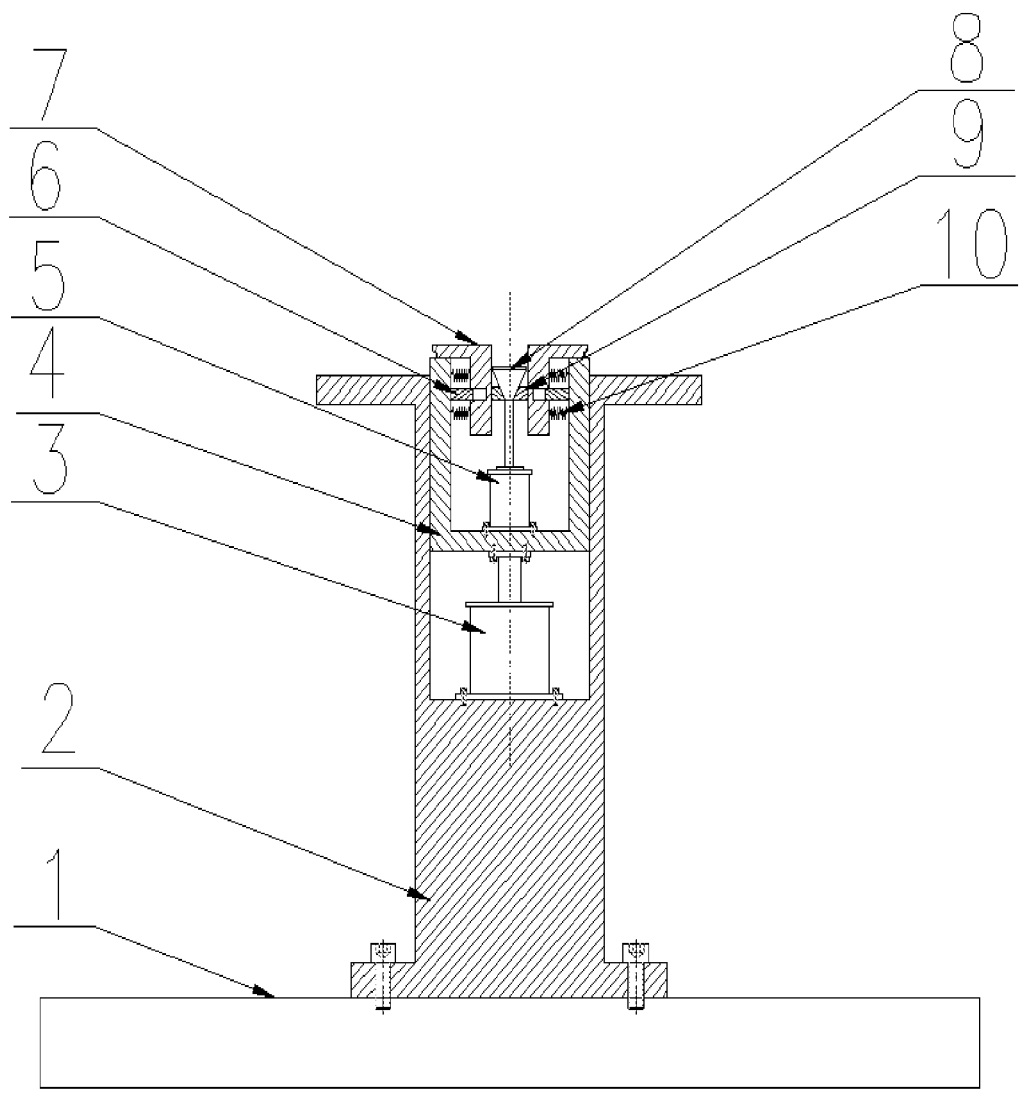
FIG. 2 is a front view of a tool-transition-free machining clamp for a wheel outer rim according to the disclosure.
Figure 3:
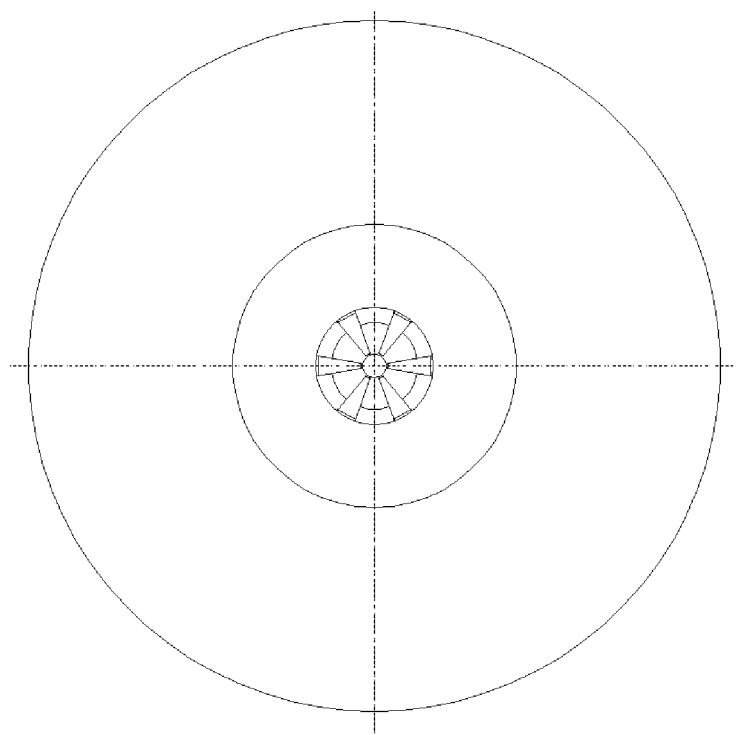
FIG. 3 is a top view of a tool-transition-free machining clamp for a wheel outer rim according to the disclosure.
Figure 4:
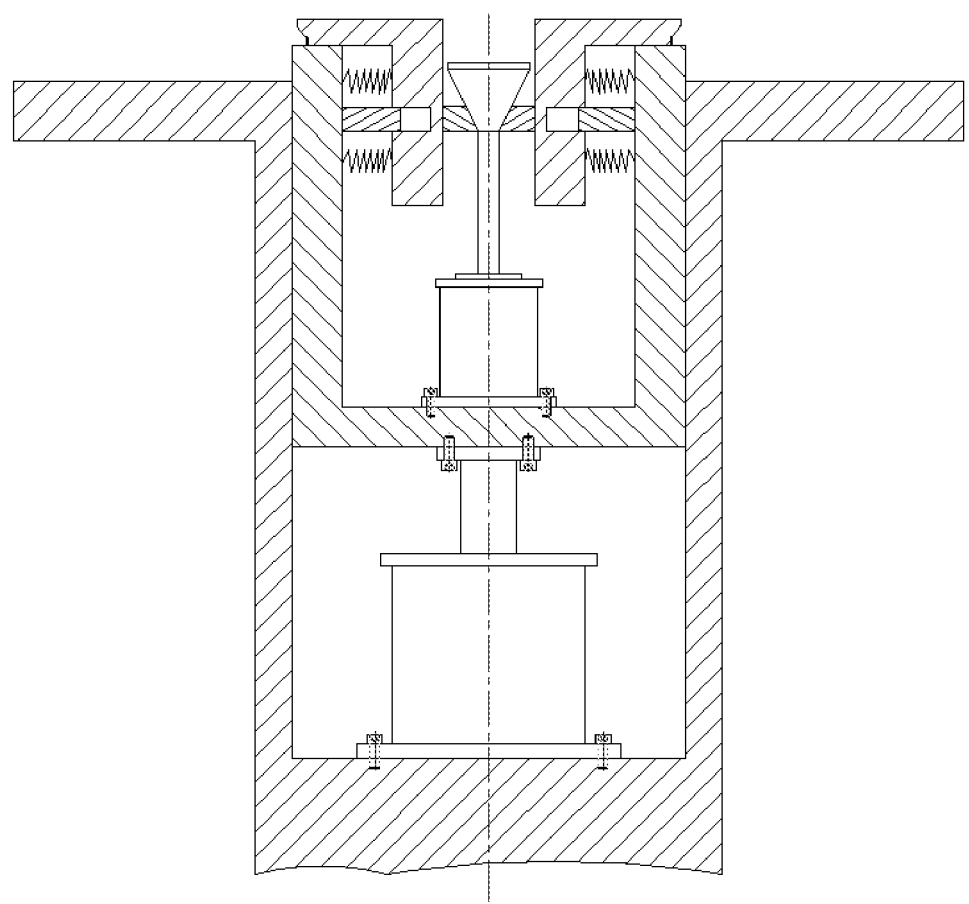
FIG. 4 is a partial enlarged view of a tool-transition-free machining clamp for a wheel outer rim according to the disclosure.
Figure 5:
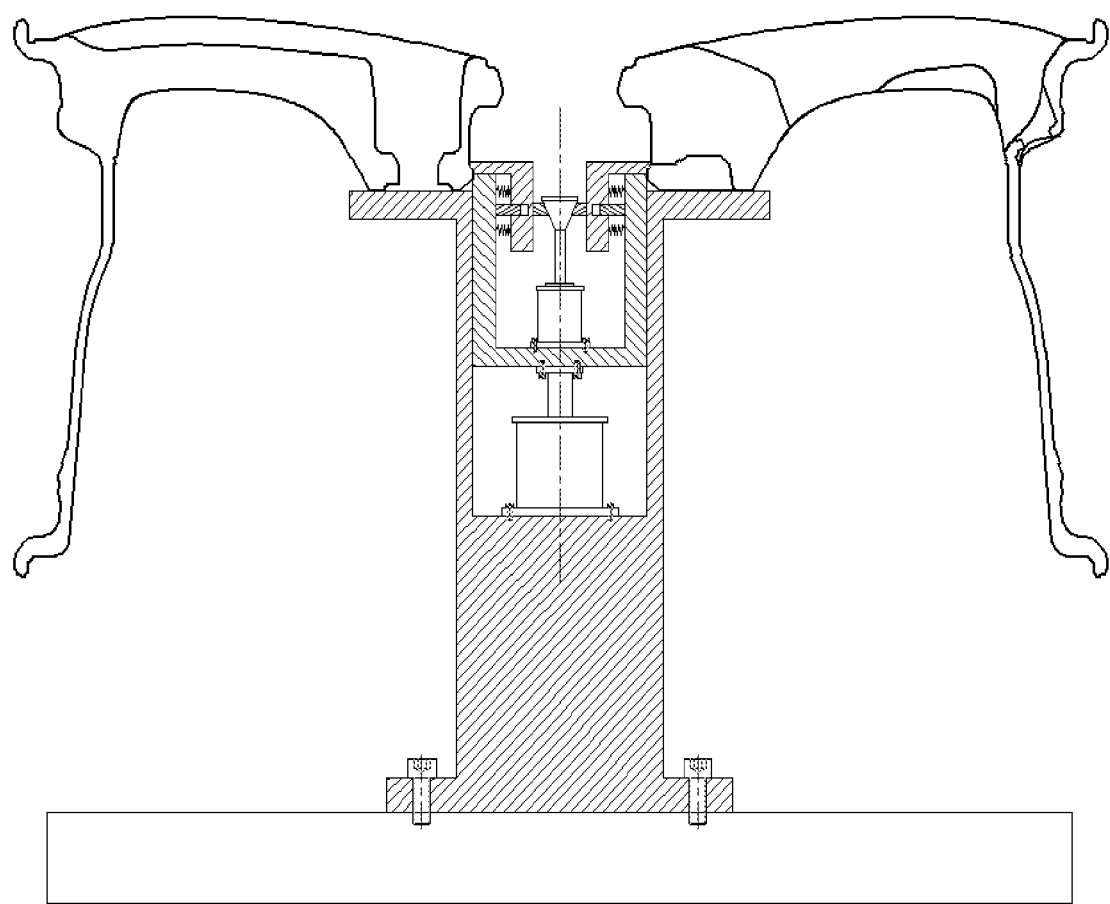
FIG. 5 is a schematic view of a tool-transition-free machining clamp for a wheel outer rim according to the disclosure after positioning and clamping.

As illustrated in FIGS. 1-5, a tool-transition-free machining method for a wheel outer rim can include the process steps that first, primary turning is conducted, then holes are drilled by a machining center, and finally secondary turning is conducted.

(1) During the primary turning, specifically, cast wheel lips on the front side of a wheel are used for positioning and clamping, and an inner rim, a spoke back cavity, a center hole and a flange are turned entirely; an outer rim from the inner flange to the outer wheel edge is roughly turned, and after the outer rim is roughly turned, 0.2-0.3 mm of process redundancy is reserved for fine turning.

(2) Holes are drilled by a machining center as follows: after primary turning is completed, bolt holes, a valve aperture, a bolt hole chamfer and a valve aperture countersink are drilled out by the machining center (3) During the secondary turning, specifically, a flange surface machined by primary turning is used for radial positioning, the center hole machined by primary turning is used for radial positioning, an inclined surface on the upper portion of a straight table of the center hole machined by primary turning is used for compression, the front side, a cap and part of the outer rim which is not machined during primary turning are turned during secondary turning, the part of the outer rim which is not machined during primary turning is roughly turned at first, the reserved process redundancy is 0.2-0.3 mm, finally, the whole wheel outer rim is finely turned once or twice, thus, the whole outer rim is machined in one effort, and the outer rim is free of tool-transition.

A tool-transition-free machining clamp for a wheel outer rim is composed of a rotating chassis 1, an axial positioning column 2, a tensioning oil cylinder 3, a radial positioning ring 4, an adjusting oil cylinder 5, guide pins 6, compression blocks 7, a tapered extension core 8, push rods 9 and springs 10. The axial positioning column 2 is fixed to the center of the rotating chassis 1, a flange plate on the axial positioning column 2 is in contact with a flange face of a wheel, and axial positioning is achieved. The axial positioning column 2 is internally provided with the tensioning oil cylinder 3, and the output end of the tensioning oil cylinder 3 is connected with the radial positioning ring 4, and the outer wall of the radial positioning ring 4 makes contact with a center hole of the wheel, so that radial positioning is achieved. The adjusting oil cylinder 5 is mounted in the radial positioning ring 4, and the output end of the adjusting oil cylinder 5 is connected with the tapered extension core 8. One end of the push rod 9 is fixed on the corresponding compression block 7, and the other end of the push rod 9 is matched with the tapered extension core 8. The compression blocks 7 are connected with the inner wall of the radial positioning ring 4 through the springs 10 and the guide pins 6.

After the wheel is placed in the clamp for positioning, the adjusting oil cylinder 5 is started, and the tapered extension core 8 is pulled to move downwards, thus, the compression blocks 7 are pushed by the push rods 9 to radially move outwards, when the compression blocks 7 move outwards to the appropriate position, the tensioning oil cylinder 3 is started, and the radial positioning ring 4 is driven to move downwards, so that the compression blocks 7 press against the inclined surface on the upper portion of a straight table of the center hole, and the wheel is compressed. In an embodiment, the number of the compression blocks 7 may be 6 to 10. After the wheel is machined, the tapered extension core 8 moves upwards, and the compression blocks 7 are reset through elastic force of the springs 10.

Through the machining method and clamp, one-step machining of the wheel outer rim can be completed. By adopting the method, the wheel outer rim is free of tool-transition, which is more favorable for control over average run-out and balance of the inner side and the outer side of the wheel. The clamp adopted by the method is advanced in process, stable, efficient and easy to manufacture.

The invention claimed is:

1. A tool-transition-free machining method for an outer rim of a wheel, comprising the following process steps: firstly, a primary turning is conducted, then holes are drilled out by a machining center, and finally a secondary turning is conducted, wherein the wheel is clamped by a tool-transition-free machining clamp during the process steps of the tool-transition-free machining method, the tool-transition-free machining clamp comprises a rotating chassis, an axial positioning column, a tensioning oil cylinder, a radial positioning ring, an adjusting oil cylinder, guide pins, compression blocks, a tapered extension core, push rods and springs, the axial positioning column is fixed to an center of the rotating chassis, the axial positioning column is internally provided with the tensioning oil cylinder, the tensioning oil cylinder is connected with the radial positioning ring, the adjusting oil cylinder is mounted in the radial positioning ring and connected with the tapered extension core, one end of each push rod is fixed on a respective one of the compression blocks, and the other end is matched with the tapered extension core, the compression blocks are connected with an inner wall of the radial positioning ring through the springs and the guide pins, wherein during the primary turning, the outer rim from an inner flange of the wheel to an outer edge of the wheel is roughly turned, and after the outer rim is roughly turned, 0.2-0.3 mm of machining allowance is reserved for fine turning, and wherein during the secondary turning, a flange plate on the axial positioning column is in contact with a flange face of a wheel to achieve an axial positioning of the wheel, an outer wall of the radial positioning ring is in contact with a center hole of the wheel to achieve a radial positioning of the wheel, the compression blocks press against an inclined surface on an upper portion of a straight table of the center hole for compressing the wheel, then the outer rim which is not machined during primary turning is roughly turned at first and 0.2-0.3 mm of machining allowance is reserved, finally, whole of the outer rim is finely turned once or twice, so that whole of the outer rim is machined.

\* \* \* \* \*